(12) United States Patent
Ackermann et al.

(10) Patent No.: US 8,888,882 B2
(45) Date of Patent: Nov. 18, 2014

(54) FILTER MECHANISM FOR INTERNAL COMBUSTION ENGINES

(75) Inventors: Steffen Ackermann, Speyer (DE); Ralf Bauder, Ketsch (DE); Duc Cuong Nguyen, Laatzen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 281 days.

(21) Appl. No.: 13/559,071

(22) Filed: Jul. 26, 2012

(65) Prior Publication Data

US 2013/0192181 A1 Aug. 1, 2013

Related U.S. Application Data

(63) Continuation of application No. 12/645,706, filed on Dec. 23, 2009, now Pat. No. 8,246,702.

(30) Foreign Application Priority Data

Dec. 23, 2008 (DE) .................... 20 2008 017 059 U

(51) Int. Cl.
| | |
|---|---|
| *B01D 50/00* | (2006.01) |
| *B01D 46/00* | (2006.01) |
| *F01N 3/021* | (2006.01) |
| *F02M 35/02* | (2006.01) |
| *F02M 35/024* | (2006.01) |
| *B01D 46/24* | (2006.01) |

(52) U.S. Cl.
CPC ............ *F01N 3/021* (2013.01); *B01D 46/0021* (2013.01); *B01D 50/002* (2013.01); *F02M 35/0203* (2013.01); *F02M 35/024* (2013.01); *B01D 46/2411* (2013.01)
USPC .................. 55/385.3; 55/482; 55/486; 55/521

(58) Field of Classification Search
USPC .................................. 55/385.3, 482, 486, 521
See application file for complete search history.

(56) References Cited

U.S. PATENT DOCUMENTS 8,157,880 B2 * 4/2012 Muenkel ...................... 55/385.3

* cited by examiner

*Primary Examiner* — Robert A Hopkins
(74) *Attorney, Agent, or Firm* — James Hasselbeck

(57) ABSTRACT

A filter device (10) for an internal combustion engine includes a separator that is embodied as a cyclone preseparator (26), a main filter element (36) exchangeably arranged in a housing compartment (68) of the filter housing (12), and a secondary filter element (38. The housing compartment (68) includes insertion stays (64). The main filter element (36) is embodied in as a double bellows filter including a first radially inwardly positioned filter bellows (40) and a second radially outwardly positioned filter bellows (42) surrounding it. Upon closing of a servicing housing cover (18) a sealing force is generated that acts onto the main filter element (36) and is maintained in the closed state of the servicing cover (18).

15 Claims, 9 Drawing Sheets

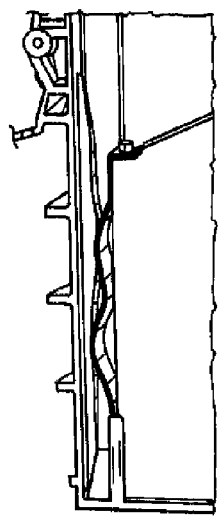 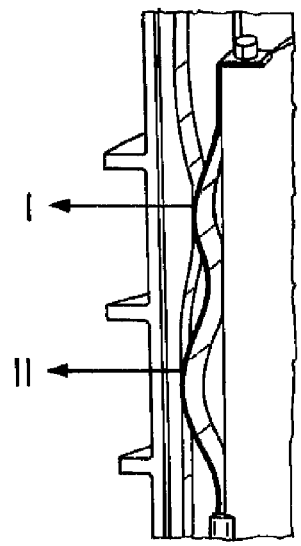
Fig.13a      Fig.13b
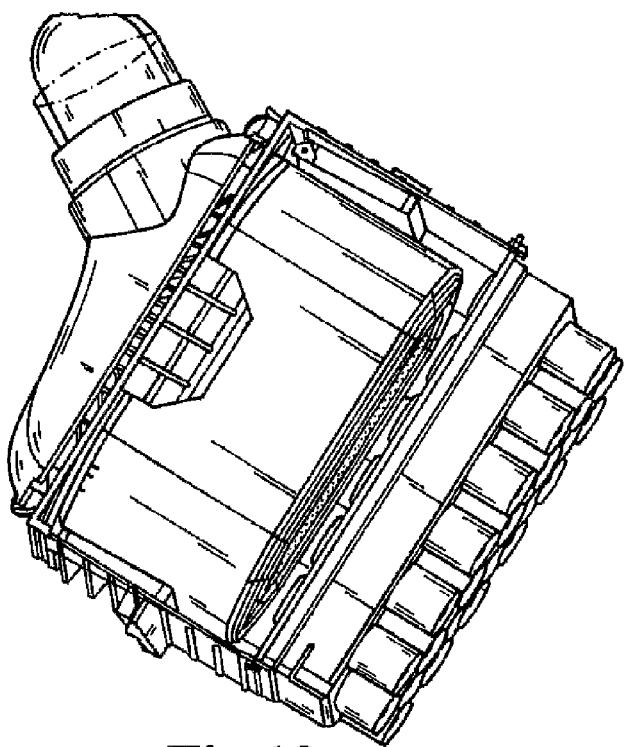 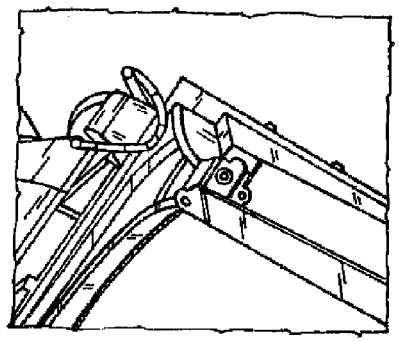
Fig.13c      Fig.13d

FILTER MECHANISM FOR INTERNAL COMBUSTION ENGINES

CROSS REFERENCE TO RELATED APPLICATIONS

The present patent application is a continuation of U.S. patent application Ser. No. 12/645,706 filed Dec. 14, 2009, the entire contents of which are incorporated herein by reference and to the fullest extent of the law. Priority is claimed through U.S. patent application Ser. No. 12/645,706 to German patent application DE 20 2008 017 059.1 filed Dec. 23, 2008.

TECHNICAL FIELD

The invention concerns a filter device, in particular an air filter for internal combustion engines.

BACKGROUND OF THE INVENTION

EP 1 509 311 B1 concerns an air filter with a wound filter medium. The air filter according to EP 1 509 311 B1 comprises a housing with an inlet end and an outlet end opposite thereto and a sidewall that extends between the inlet end and the outlet end. The sidewall comprises an access opening as an access to the interior of the housing. The access opening, in turn, is arranged between the inlet end and the outlet end. The air filter comprises furthermore a filter element with a sealing element that is operatively mounted in the housing. This sealing element separates the clean air from the raw air side. The housing is constructed and arranged such that it may receive the filter element through the access opening in the sidewall. A servicing cover is provided that is detachably mounted on the access opening between the inlet end and the outlet end.

The filter element comprises a first flow surface and an opposed second flow surface. The filter element comprises several fold chambers wherein each of the fold chambers comprises, adjacent to the first flow surface, a portion that is positioned upstream and, adjacent to the second flow surface, a flow portion that is positioned downstream.

The filter element is arranged such that the air flows via the inlet end of the housing through the first flow surface and the second flow surface and exits the housing through the outlet end. The filter element comprises a terminal disk about a periphery of the first flow surface. A portion of the frame projects into the periphery of the first flow surface. The servicing cover comprises a shoulder that extends in the direction of the interior of the housing and supports the filter element when the filter element is installed in the housing. The shoulder of the servicing cover engages the frame and rests against the first flow surface in order to secure the filter element.

SUMMARY OF THE INVENTION

The invention has the object to realize a simple handling of the filter element and to transfer it in a way as simply as possible into its operating position within the filter housing of a filter device, in particular to provide in a very simple way a sealing action of the filter element.

According to the invention, this object is solved by the features of the independent claims.

The dependent claims relate to advantageous further embodiments of the principle upon which the invention is based.

According to the invention, it is proposed to design a servicing cover for closing a housing compartment of a filter housing of a filter device in such a way that, when closing the servicing cover, the filter element that has been inserted before into the housing compartment of the filter housing will be positioned properly and, by closing the servicing cover, a sealing force is generated with which the filter element that is premounted in its proper position in the housing compartment is moved against a lateral surface of the housing compartment in the filter housing.

The filter device proposed according to the invention is advantageously one that comprises several components, for example, a prefilter stage in the form of a cyclone preseparator, the already mentioned main filter element as well as a secondary or safety filter element that is arranged in axial direction, i.e., in the flow direction of the fluid to be filtered, downstream thereof. The cyclone preseparator that is upstream of the main filter element or the housing compartment of the filter housing comprises a discharge opening through which coarse particles of the fluid to be filtered are discharged. The cyclone preseparator can be connected in an advantageous way by a screw connection that extends from the end face of the cyclone preseparator along the side walls of the housing compartment to the filter housing. In this way, a seal-tight connection along a butt joint between the cyclone separator and the housing compartment of the filter housing is provided so in that no foreign air can be taken in that has not passed through the cyclone preseparator. Moreover, the screw connection provides a possibility for servicing the cyclone separator.

The secondary filter element that is arranged downstream of the exchangeable filter element arranged in the housing compartment can be secured on the rib-shaped or cupola-shaped projections within a funnel-shaped compartment at the outlet side of the filter housing without this requiring additional fixation elements. In an advantageous way, the secondary filter element downstream of the main filter element can be changed without tools, in particular by a simple one-hand operation.

The main filter element that is exchangeably received in the housing compartment of the filter housing is preferably a multi bellows filter, in particular a double bellows filter. It comprises a first radially inwardly positioned filter bellows that is cylindrical or conical relative to its outer diameter and is surrounded with formation of an optionally conical or cylindrical flow space by a further second radially outwardly positioned filter bellows. Both filter bellows of the multi filter bellows are embodied advantageously so as to be glued at the front edges. The individual filter folds extend preferably in axial direction, i.e., parallel to the flow path of the fluid to be cleaned that is passing through the filter housing.

As already mentioned, in an advantageous way on the housing compartment that is formed within the filter housing a servicing cover is provided. The latter is supported by means of hinges such that the servicing cover can be gripped by a grip and can be pivoted about the hinges positioned opposite the grip. As a result of the sizing of the diameter of the hinges the servicing cover can be locked in its open position, can simply be moved out of this position for closing and positionally secured by a locking action, in particular, a locking action provided on the cyclone preseparator. For this purpose, the grip member of the servicing cover engages a grip depression at the top side of the cyclone preseparator that is preferably manufactured by plastic injection molding and locks thereat. By a simple pressing action against the grip member that is substantially oriented perpendicularly to the servicing cover, the locking action within a depression at the end face of the cyclone preseparator can be canceled and the servicing cover can be opened, in particular by a one-hand operation.

After the servicing cover has been opened, the main filter element mounted in the housing compartment of the filter housing can be removed easily. For this purpose, the main filter element is provided with a grip tab so that a one-hand action is possible. This seal of the main filter element is released in axial direction so that the main filter element can be removed in the upward direction. As a result of the design of the hinges the servicing cover after having been opened remains in its open position so that the operator who has possibly only one hand available can grip the main filter element at the grip tab or the grip member while, with the other hand, he holds onto a grip, for example, above the engine compartment of a tractor or a construction machine.

After removing a spent main filter element a new main filter element can be simply inserted into the housing compartment. The main filter element can also be cleaned off and after cleaning can be reinstalled and can thus be used several times. For this purpose, the two oppositely positioned lateral surfaces of the housing compartment receiving the main filter element each can be provided with ramp-shaped projections. The ramp-shaped projections that are preferably integrally injection-molded with a reinforcement structure onto the lateral surfaces of the housing compartment ensure insertion of the main filter element into the housing compartment of the filter housing in correct orientation. Moreover, a wrong insertion of the filter element is prevented in that through the housing compartment the screw guides extend that represent a further safety detail with regard to mounting the main filter element in the housing compartment of the filter housing in the proper position.

As soon as the main filter element with its upper circumferentially extending rim has been inserted into the housing compartment along the ramps, the servicing cover can be closed. For this purpose, the servicing cover that is open is gripped at the grip member and pivoted about the hinges. On the inner side the servicing cover advantageously comprises at least one, preferably two spaced apart shoulders. Upon closing of the servicing cover these shoulders engage the circumferentially extending collar on the topside of the main filter element that is already pre-positioned by the ramp-shaped stays integrally injection-molded on the lateral surfaces of the housing compartment. When closing the servicing cover, the sealing force in the filter device according to the invention is generated because by means of the preferably two shoulders that are integrally injection-molded on the inner side of the servicing cover a circumferentially extending collar on the main filter element is engaged and sealed against a complementary sealing surface on the inner side of the filter housing on that side that is facing the secondary filter element. In the filter device proposed according to the invention the sealing force is generated upon closing the servicing cover. The sealing force that acts preferably in axial direction is maintained in the closed state of the servicing cover and is released only when opening the servicing cover. The sealing force is advantageously maintained in the already mentioned locking action between the grip member of the servicing cover and a depression, formed, for example, on the cyclone preseparator, during the closed state of the servicing cover.

In an advantageous embodiment of the principle upon which the invention is based, the servicing cover is manufactured by injection molding of plastic material wherein the grip member is integrally injection-molded onto the front side of the servicing cover, opposite to at least one hinge. The grip member is advantageously designed such that a one-hand operation is possible. For this purpose, the grip member may comprise an opening, but it can also be designed without an opening. The grip member is advantageously provided with a contour that forms a depression-like recess that interacts with a counter member of the locking action—formed in the depression—and thus ensures the locking action of the servicing cover in the closed state and maintaining the sealing force in relation to the main filter element in the housing compartment of the filter housing by the shoulders contacting a circumferentially extending collar of the main filter element in the closed state of the servicing cover. Alternatively, the grip member can also be of a multi-part configuration.

In an advantageous further embodiment of the principle upon which the invention is based, the secondary filter element that is arranged downstream of the main filter element, embodied preferably as a multi bellows filter element, is exchangeably arranged in a funnel-shaped recess of the filter housing. For this purpose, in the funnel-shaped recess in the filter housing several cupola-shaped projections can be formed. Between these cupola-shaped projections that are formed, for example, on the bottom side and topside of the funnel-shaped openings, the secondary filter element is inserted; this can also be done with one hand. No further fixation elements are needed for the secondary filter element that is to be positioned downstream of the main filter element in the funnel-shaped area of the filter housing at the outlet side.

In an advantageous manner the main filter element is embodied as a multi bellows filter, in particular as a double bellows filter, in which the axial end faces at the inlet side each are closed off by cover. While, for example, the radially outwardly positioned filter bellows is cylindrical or conical, the inwardly positioned inner bellows can have a conical shape so that between the inner diameter of the radially outwardly positioned filter bellows and the conically extending outer diameter of the radially inwardly positioned filter bellows a conically extending flow space is provided. This flow space that has the aforementioned conical shape is filled by a support structure that has a rib-shaped structure that extends in axial direction as well as in circumferential direction. By means of the support structure, in particular for other sizes of the filter device proposed according to the invention, it is ensured that the configuration of the geometry of the flow space of the main filter element is maintained even after extended operation and that outflow is ensured. The radially inwardly positioned filter bellows delimits an interior that, in turn, is closed off by a cover disk. As a result of the selected positioning of the cover disks or the cover disk on the outlet side or the annular ring at the inlet side, it is ensured that the fluid to be filtered that has passed the cyclone preseparator flows into the interior of the main filter element that is closed off at the outlet side by the cover disk. In this way, a radial deflection is imparted onto the fluid to be filtered so that the first radially inwardly positioned filter bellows is flowed through in the radial direction. Cleaned fluid thus enters the conically extending flow space. Since the axial end face of the radially outwardly positioned filter bellows is also closed off by the annular cover, flow-through of the radially outwardly positioned filter bellows is done from the exterior side. The fluid to be cleaned enters the flow space coming from the outer surface of the radially outwardly positioned filter bellows in radial direction and passing through it. The flow space that has a conical configuration comprises an outlet opening from which the cleaned fluid flows into the secondary filter element.

The main filter element is in particular in the form of the aforementioned multi bellows filter, preferably a double bellows filter. Its cover at the inlet side can be made from a plastic material, for example, as a PUR ring and can be circular or oval. The axial end faces of the inwardly positioned conically shaped filter bellows and of the outwardly positioned cylindrically embodied filter bellows can be integrated therein by foaming. Downstream on the main filter element, formed on the circumferentially extending rim, the grip member is provided as well as a blade-shaped structure for stabilization of a seal. The circumferentially extending rim as well as the blade-shaped contour that is preferably provided with penetrations, are injection-molded of a harder plastic material and serve for stabilization of the seal that can also be produced by foaming of PUR. Advantageously, the blade-shaped structure of the frame is provided with penetrations so that the plastic material, for example, PUR, of which the seal is preferably produced by foaming, is reliably secured on the blade and stabilized. This increases the service life and sealing action of the seal that is circumferentially foamed onto the frame. Instead of the aforementioned plastic material PUR, other easily processable plastic materials that generate a high sealing force and have elastic properties can also be integrally injection-molded onto the blade-shaped structure. In an alternative possible embodiment variant on the ramps, integrally injection-molded onto the lateral surfaces of the housing compartment of the filter housing and interrupted by reinforcement ribs, shoulders can be provided also into which leaf springs can snap. The leaf springs, in turn, are connected to the bottom side of the circumferentially extending injection molded frame of the main filter element. When the main filter element is inserted into the housing compartment with one hand, the operator will sense haptically that upon reaching the first locking position a correct insertion process has been realized and upon exertion of greater insertion force and overcoming a second spring force when reaching the second shoulder haptically a correct position of the filter element.

BRIEF DESCRIPTION OF THE DRAWINGS

Embodiments of the filter device according to the invention for an internal combustion engine will be explained in more detail with the aid of the Figures in the drawings.

FIG. 13 depicts a leaf spring-like filter element locking action in the filter housing: a) housing-side and element-side structure; b) two-stage locking possibility; c) and d) possible position of locking action on the housing and the filter element.

Same parts in the following Figures are identified with identical reference numerals.

DETAILED DESCRIPTION

Figure 1:
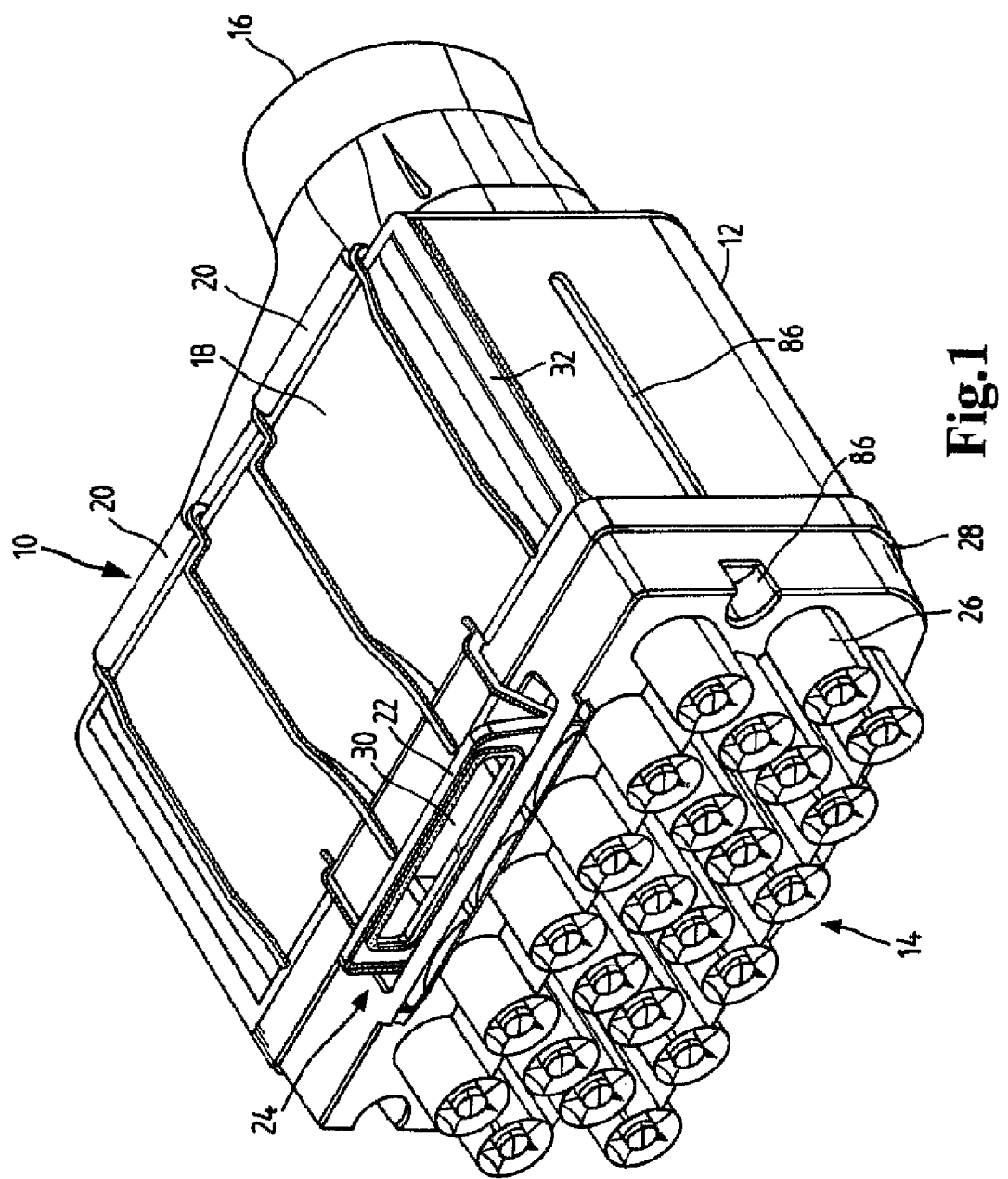
FIG. 1 is a perspective illustration of the filter device proposed according to the invention with cyclone preseparator, filter housing, and servicing cover shown in closed position with grip member.

The illustration according to FIG. 1 shows in a perspective view a filter device proposed according to the invention.

The filter device 10 according to the perspective illustration in FIG. 1 is in particular used as an air filter element for off-highway applications such as tractors, combines, agricultural machines, construction machinery. The filter device 10 proposed according to the invention is manufactured in various sizes, depending on the fluid volume flow to be filtered.

In FIG. 1 the filter device 10 proposed according to the invention comprises a filter housing 12. The fluid to be cleaned flows into the filter device 10 at the inlet side 14 and exits the filter device at the outlet side 16. The filter housing 12 comprises a servicing cover 18 that closes off a housing compartment of the filter housing 12. The servicing cover 18 is pivotably received in two hinges 20 that are arranged adjacent to one another and are formed preferably as plastic hinges and have a variable diameter so that the servicing cover in the open state is lockable and a one-hand exchange of a main filter element of the filter device 10 proposed in accordance with the invention is ensured even under difficult conditions.

The servicing cover 18 comprises a grip member 22 on the side opposite the at least one hinge 20. The grip member 22 in the illustration according to FIG. 1 is provided with an opening 30 but could also be of an uninterrupted configuration, i.e., could have a continuous grip surface without the formation of an opening 30.

The illustration according to FIG. 1 discloses that the servicing cover 18 is shown in the closed position and is locked with its grip member 22 in a locking action 24. The locking action 24 is realized between grip member 22 and cyclone preseparator 26 arranged upstream of the filter housing.

As can be seen also in the perspective illustration according to FIG. 1, the cyclone preseparator 26 is connected with the filter housing 12 by means of a screw guide 86, i.e., by a screw connection. In this way, a butt joint 28 between the cyclone preseparator 26 and the filter housing 12 is seal-tightly closed so that no foreign air intake can be sucked in which has circumvented the cyclone preseparator 26.

The servicing cover 18 has a projection 32 that as illustrated in FIG. 1 covers seal-tightly the filter housing 12 and the housing compartment formed therein.

The cyclone preseparator 26 illustrated in FIG. 1 and positioned at the inlet side 14 as well as the filter housing 12 and the servicing cover 18 are manufactured as injection-molded plastic parts. This enables on the one hand an inexpensive mass production and on the other hand also the formation of reinforcement ribs on the hinges or the grip member 22 and the opening 30 formed therein within a single processing step. For mounting, the cyclone preseparator 26 is simply screw-connected in the screw guides 86 extending laterally along the filter housing 12 so that a seal-tight connection between the filter housing 12 and the cyclone preseparator arranged upstream at the inlet side 14 is provided. When the components filter housing 12 and cyclone preseparator 26 are joined by the screw guides 86, the servicing cover 18 can be inserted in a simple way into the hinges 20 and with a slight deflection movement of the grip member 22 can be opened.

Figure 2:
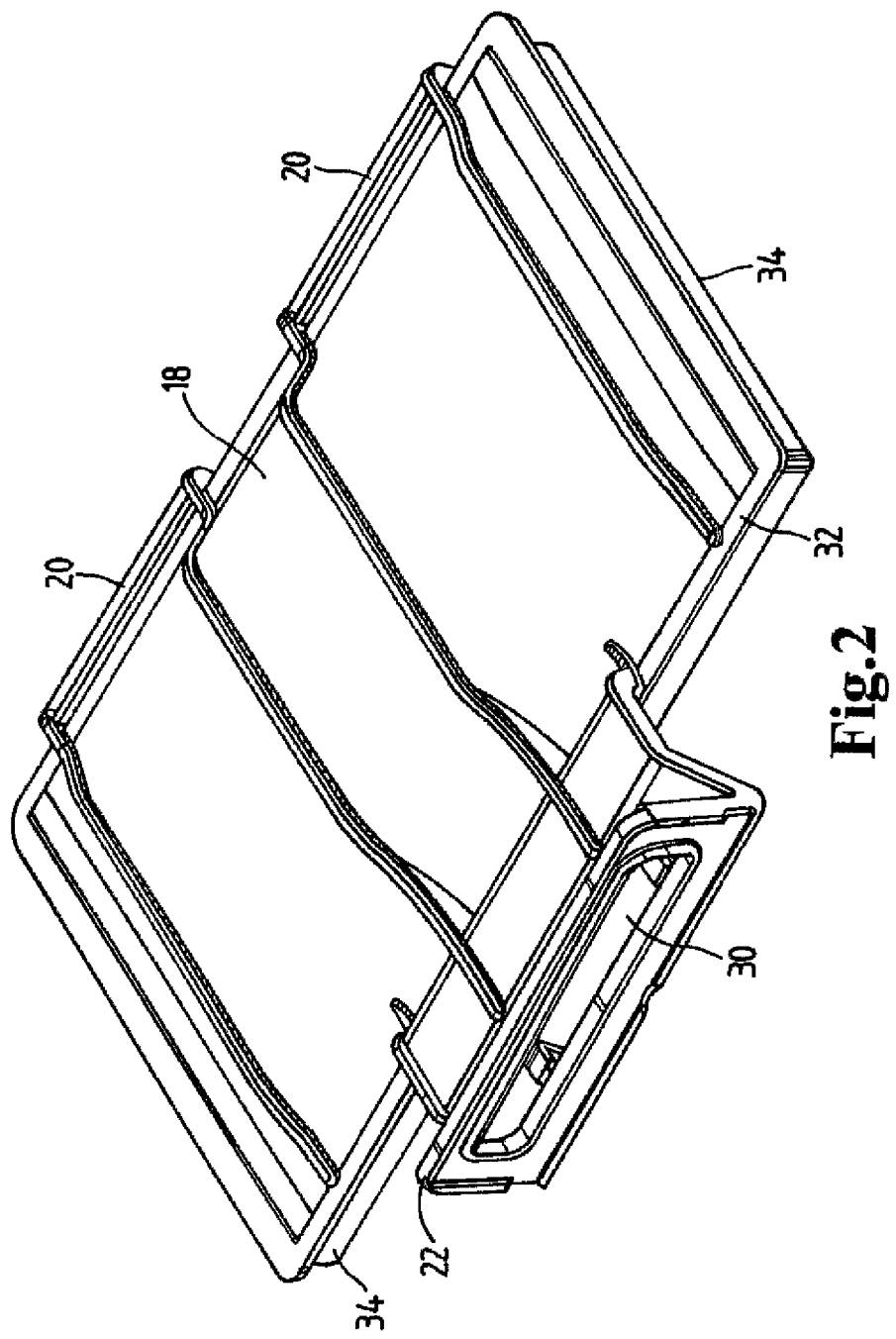
FIG. 2 illustrates the servicing cover with which the filter device in FIG. 1 is closed, with integrally injection-molded grip member and recess as well as hinges on the side facing away from the grip member.

The illustration according to FIG. 2 shows a perspective representation of the servicing cover according to the illustration in FIG. 1.

The servicing cover 18 comprises in addition to the projection 32 a circumferential collar 34 and the grip member 22 on the side opposite the at least one hinge 20. The grip member 22 comprises according to the embodiment of the servicing cover 18 of FIG. 2 an opening 30. Of course, it is also possible to manufacture the grip member 22 without the aforementioned opening 30 illustrated in FIG. 2. On the topside of the servicing cover 18 between longitudinal edges of the servicing cover 18 reinforcement ribs extend from the grip member 22 to the two hinges 20 of this embodiment that are positioned adjacent one another and spaced apart from one another. Since the servicing cover 18 also is a plastic part produced by injection molding, the reinforcement ribs, the grip member 22, the projection 32, the circumferential collar 34 as well as the hinges 20 can be produced without problems in a single processing step without requiring any fine processing.

Figure 3:
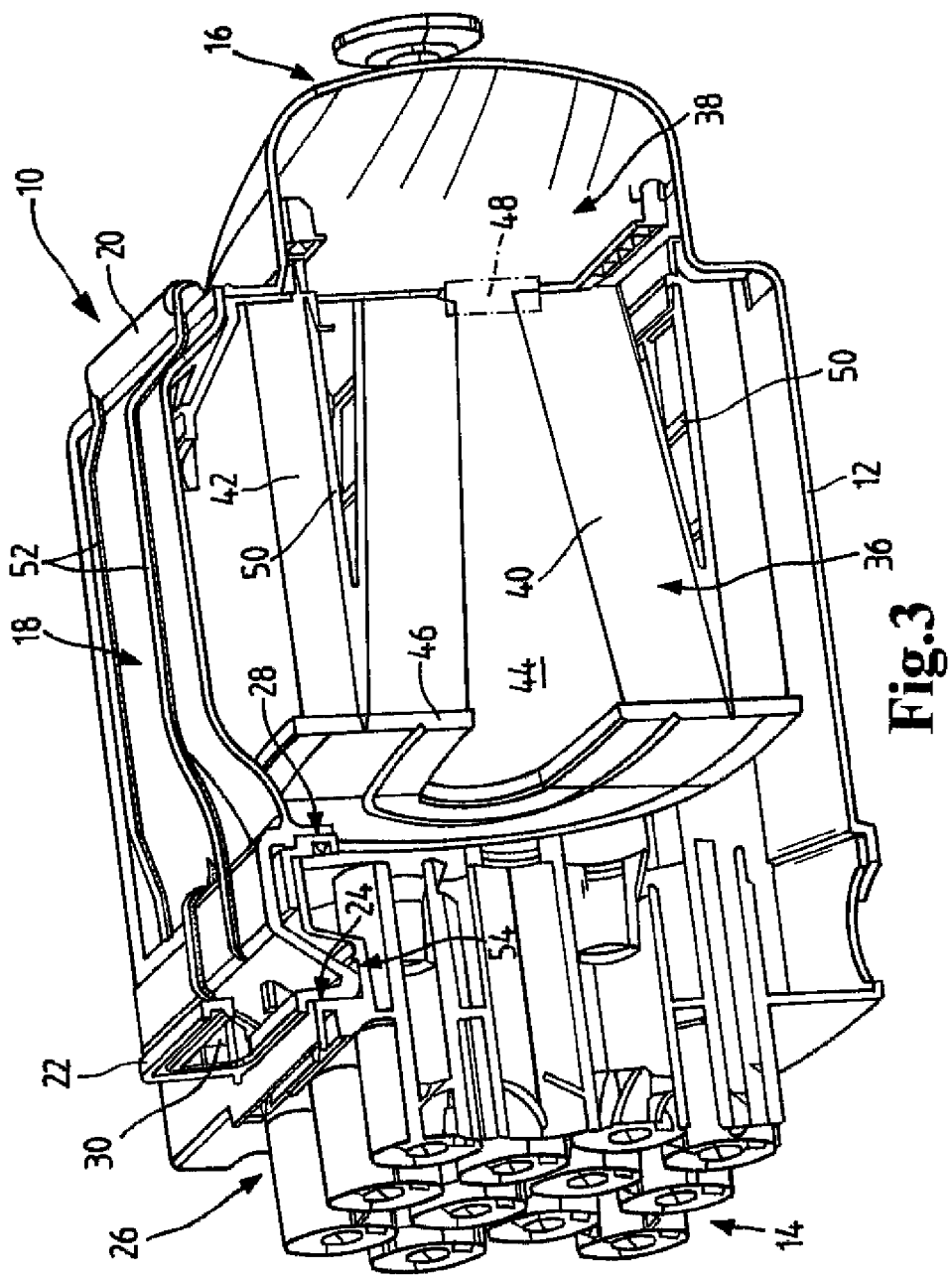
FIG. 3 is a section of the filter device according to FIG. 1 proposed according to the invention with cyclone preseparator, a multi bellows filter embodied as a double bellows filter, and a secondary filter element arranged downstream thereof, with servicing cover in closed position.

FIG. 3 shows a longitudinal section of the filter device proposed according to the invention in accordance with the perspective illustration in FIG. 1.

In the illustration according to FIG. 1 it can be seen that the filter device 10 comprises on the inlet side 14 the cyclone preseparator 26 and that in the filter housing 12 of the filter device 10 at the outlet side 16 a secondary filter element 38 is received. Downstream of the cyclone preseparator 26 within the filter housing 12 the main filter element 36 that is preferably embodied as a double bellows is in its locked position in the filter housing 12. An opening in the filter housing 12 is closed off by the closed servicing cover 18. The closed servicing cover 18 comprises a rib structure 52 that extend substantially in the longitudinal direction from the grip member 22 to the at least one hinge 20. The rib structure 52 stiffens the servicing cover 18 mechanically.

The grip member 22 in the illustration according to FIG. 3 is received in a locking action 24 which is formed in the cyclone preseparator 26. In the cyclone preseparator 26 according to the section illustration of FIG. 3 a recess 54 is formed. In the closed state of the servicing cover 18, its grip member penetrates into this recess. The locking action 24 is produced by the recess 54 in interaction with a locking depression 56 on the grip member 22.

As shown in FIG. 3, the main filter element 36 is embodied preferably as a double bellows filter element with inwardly positioned first filter bellows 40 that has a conical shape as well as an outwardly positioned second filter bellows 42 that is substantially cylindrical. Between the second filter bellows 42 and the first filter bellows 40 a support structure 50 is provided. The support structure 50 maintains the geometry of a flow space that is facing at the outlet side the secondary filter element 38. The support structure 50 is preferably formed by a plastic construction that comprises ribs extending axially and in the circumferential direction.

At the inlet side the first filter bellows 40 and the second filter bellows 42 are closed off by an annular cover 46 while the interior 44 is closed off in axial direction by the cover disk 48. In this way, the filter bellows 40 and 42 of the main filter element 36 are substantially flowed through in radial direction and the filtered fluid flows out through the space that opens conically at the outlet side and in which the support structure 50 that also has a conical shape is received.

Preferably, the annular cover 46 and the cover disk 48 of the main filter element 36 are connected by foaming to the axial end faces of the filter bellows 40 and 42. This has advantages with regard to manufacturing technology.

Figure 4:
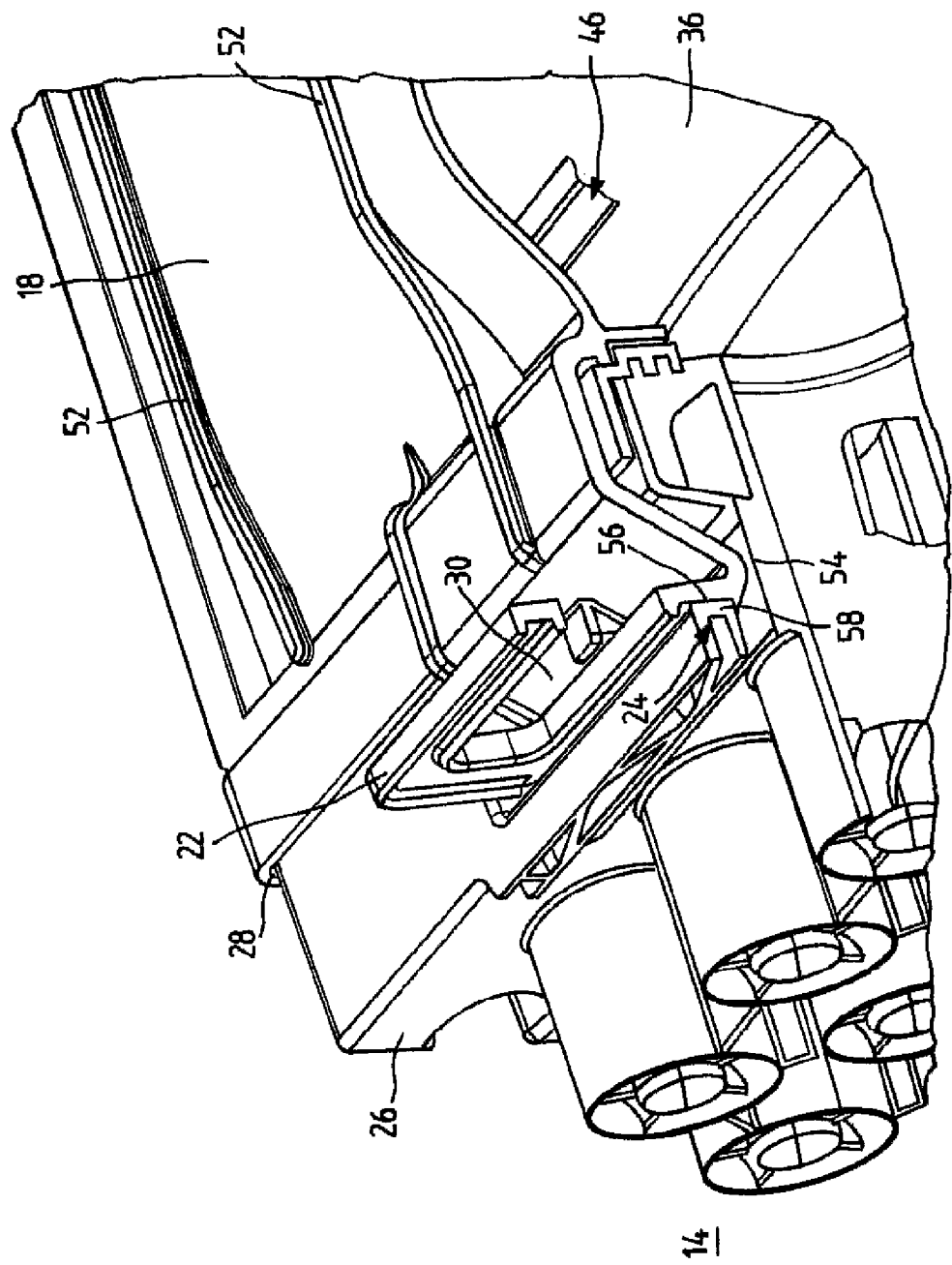
FIG. 4 is a detail illustration of the servicing cover in the closed state when closing the housing compartment of the filter housing.

FIG. 4 shows the locking action of the servicing cover 18 on the cyclone preseparator 26 of the filter device proposed according to the invention in enlarged perspective illustration.

FIG. 4 shows that the servicing cover 18 with its rib structure 52 extending in the longitudinal direction is locked on the cyclone preseparator 26. The butt joint 28 between the filter housing 12 and the cyclone preseparator 26 is sealed in that the cyclone preseparator 26 is screw-connected by means of the screw guides that are illustrated in FIG. 1 and identified with reference numeral 86 with the filter housing and therefore the butt joint 28 is sealed as a result of the pretension generated by the screw connection. This prevents that through the butt joint 28 unfiltered fluid, i.e., fluid that has not passed through the cyclone preseparator 26 and is particle-loaded, reaches the main filter element 36.

As also illustrated in the illustration of FIG. 4, the locking depression 56 that is formed on the grip member 22 with openings 30 is locked at a counter member 58 within the recess 54 of the cyclone preseparator 26 so that in this way the locking action identified by reference numeral 24 is realized. In this state, the servicing cover 18 is permanently secured in its closed position. The grip member 22 on which the opening 30 is formed projects into the recess 54 of the cyclone preseparator 26 to such an extent that the counter member 58 of the cyclone preseparator 26 can engage the locking depression 56 of the grip member 22. For releasing the locking action that is identified by reference numeral 24 the grip member 22 is deflected laterally within the recess 54 of the cyclone preseparator 26. In this way, the locking action 24 between the counter member 58 of the cyclone preseparator 26 and the grip depression 56 of the grip member 22 is released and opening of the servicing cover 18, rotatably supported on the filter housing by at least one hinge 20, is possible with one hand without a problem.

Figure 5:
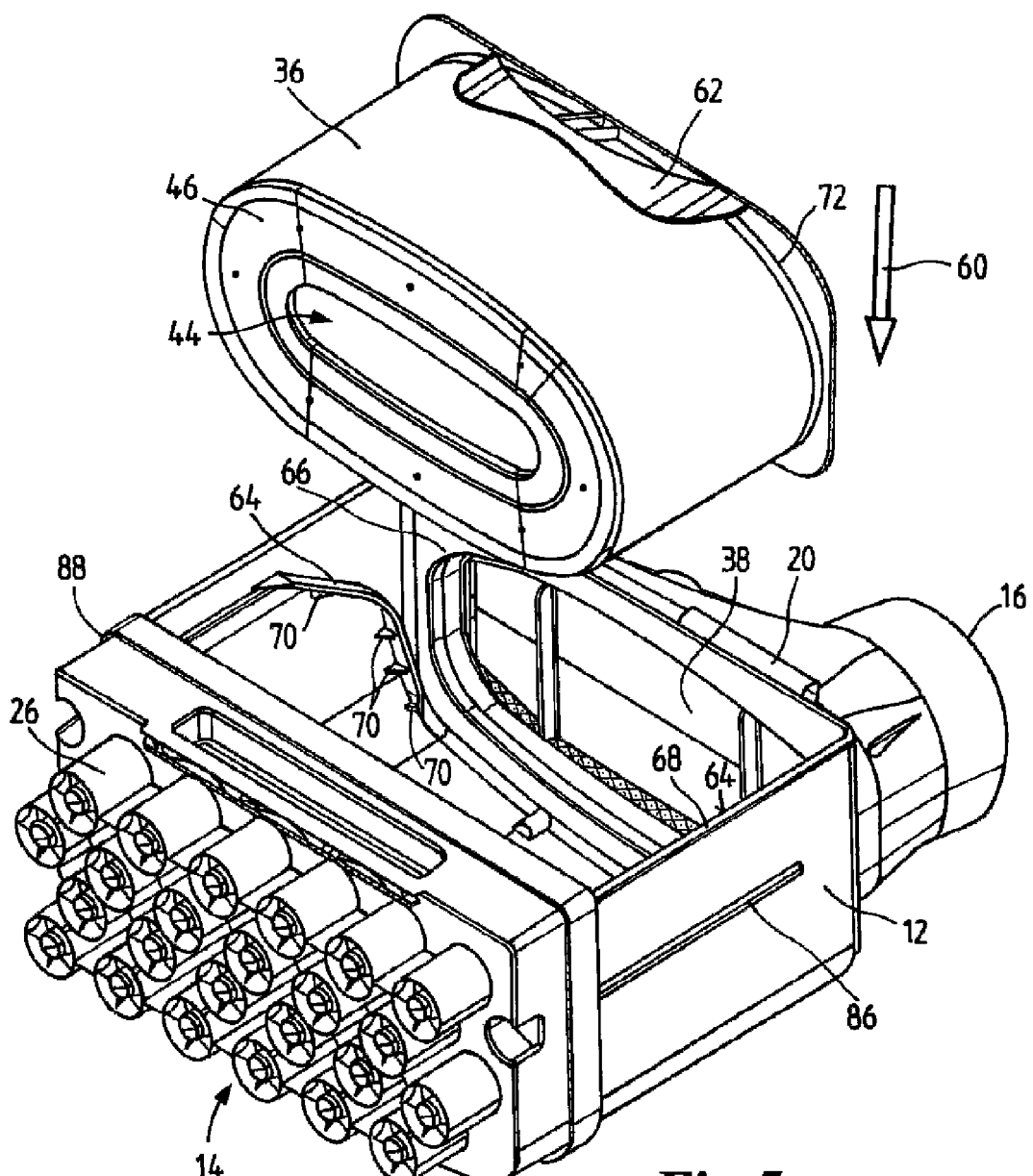
FIG. 5 illustrates the filter housing of the filter device according to the invention in the open state without servicing cover with main filter element to be installed in the insertion direction, with grip member integrated into the plastic disk.

FIG. 5 shows premounting of the main element that is embodied preferably as a double bellows filter in the housing compartment of the filter housing of the filter device proposed according to the invention.

As can be seen in the perspective illustration according to FIG. 5, the main filter element 36 is inserted in the installation direction 60 into the housing compartment 68 of the filter housing 12. The illustration according to FIG. 5 shows that the main filter element 36 on the one hand has at the inlet side the annular cover 46 that covers the axial end faces of the two filter bellows 40, 42 combined to the main filter element 36. At the outlet side, the main filter element 36 has the circumferential rim 72 on which a grip tap 62 is integrally injection-molded. The annular cover 46 surrounds an opening through which the fluid that has passed through the cyclone preseparator 26 flows into the interior 44 of the main filter element 36.

The perspective illustration according to FIG. 5 shows that the sidewalls of the filter housing 12 that adjoin the housing compartment 68 are provided with insertion stays 64 that optionally may be made stiffer by means of reinforcement ribs 70.

The main filter element 36 that is gripped with one hand by the grip tab 62 is inserted along the insertions stays 64 into the housing compartment 68 of the filter housing 12 of the filter device 10. The farther the circumferential rim 72 extending about the topside of the main filter element 36 is inserted along the insertion stays 64 in the insertion direction, the farther the circumferential rim 72 on which the seal 76 is formed is positioned on the contact surface 66 of the filter housing 12 facing the secondary filter element 68. The geometry of the insertion stays 64 prevents false mounting of the main filter element 36 because upon rotation of the filter element 36 about 180 degrees, in comparison to the illustration according to FIG. 5, its insertion into the housing compartment 68 is no longer possible because of the insertion stays 64 that laterally project from the sidewalls of the housing compartment 68.

FIG. 5 shows that on the lateral boundary walls of the housing compartment 68 of the filter housing 12 below the insertion stays 64 the screw guides 86 are formed that extend substantially in horizontal direction.

The illustration according to FIG. 5 also shows that the secondary element 38 that is received in a funnel-shaped constricted portion of the filter housing 12 also can be exchanged with a one-hand operation as long as the main filter element 36 has not yet been inserted into the housing compartment 68 of the filter housing 12.

The secondary filter element 38 can be inserted simply into integrally injection-molded cupola-shaped projections in the funnel-shaped area of the filter housing 12 at the outlet side 16 and can be secured therein without further measures. The cupola-shaped projections serve as a defined terminal stop for the secondary filter elements 38.

As a result of the oversize of the streamy injection-molded parts in the funnel-shaped area of the filter housing 12 at its outlet side 16 the secondary filter element 38 is secured therein.

Figure 6:
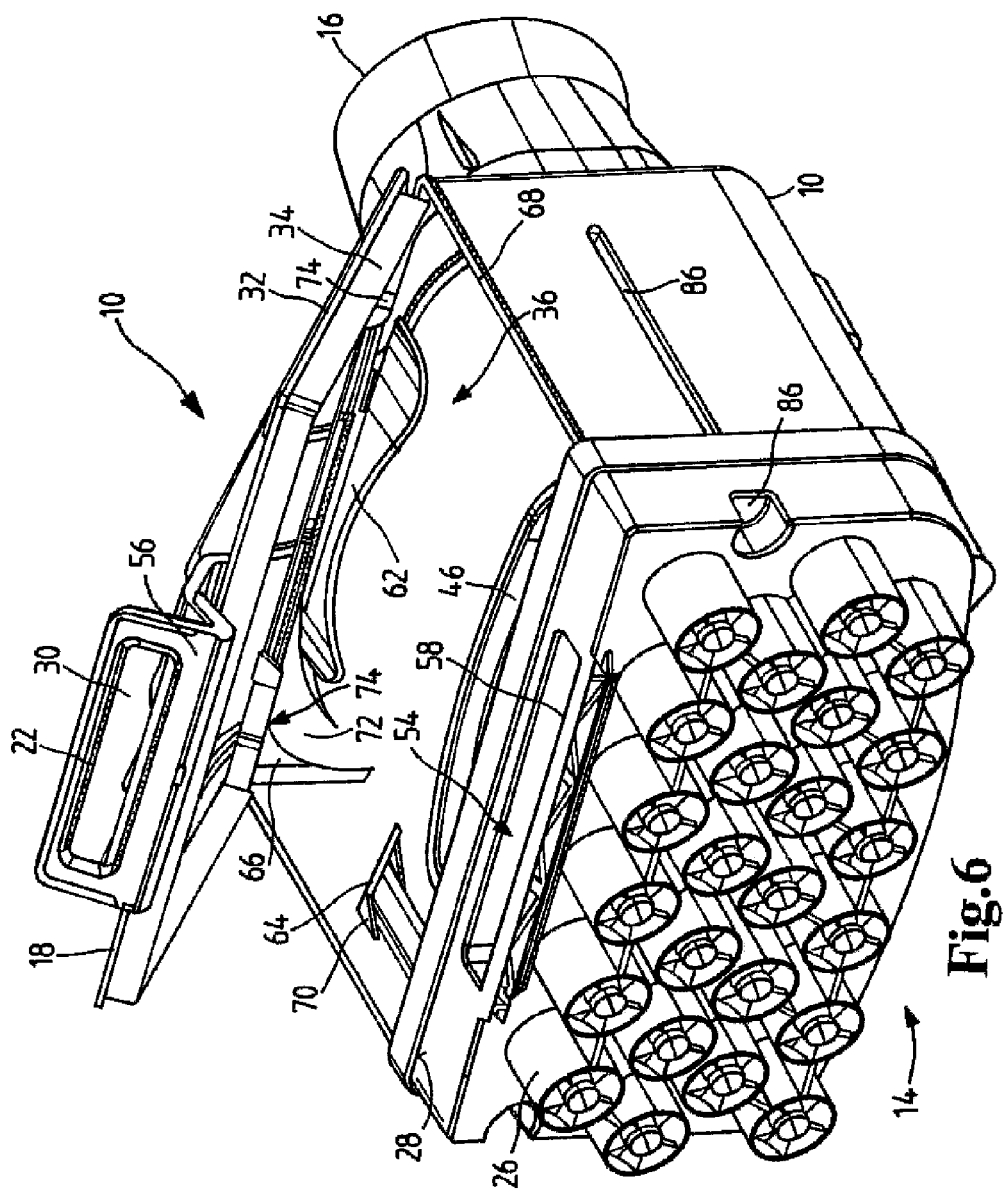
FIG. 6 depicts the generation of the sealing force between the filter housing and the main filter element upon closing of the servicing cover.

FIG. 6 shows the positioning of the main filter element 36 premounted in the housing compartment of the filter housing 12 when closing the servicing cover 18.

The illustration according to FIG. 6 shows that the main filter element 36 along the insertion stays 64 has been completely inserted along the lateral surfaces of the housing compartment 68 into the latter. In this connection, the servicing cover 18 may be pivoted either into an open position or it may be removed from the integrally injection-molded hinges 28 whose counterpart is integrally injection-molded onto the filter housing 12. The main filter element 36 is gripped at the grip tab 62 that is integrally injection-molded on the circumferential rim 72 and inserted into the housing compartment 68 of the filter housing 12 of the filter device 10 proposed according to the invention.

Figure 7:
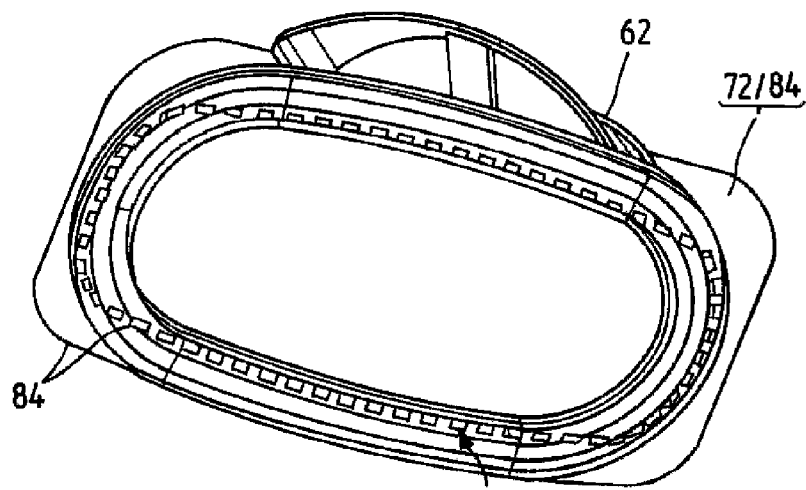
FIGS. 7, 8, 9 show details of the circumferentially extending collar on the topside of the main filter element with integrally injection-molded grip member.
Figure 8:
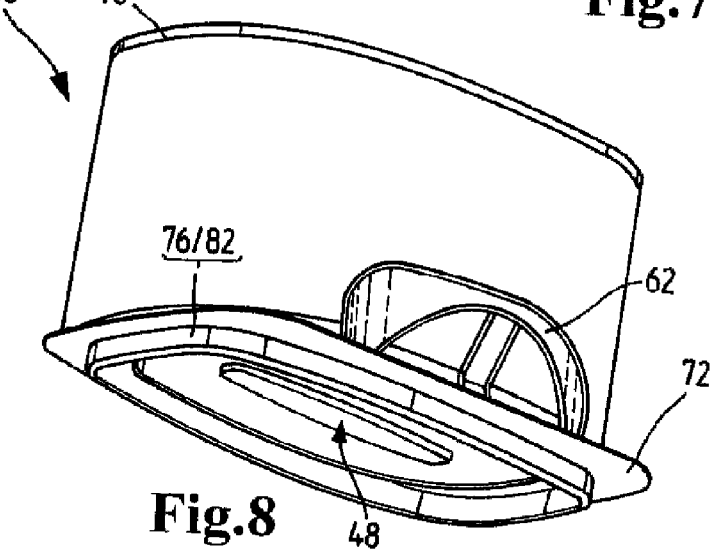
Figure 9:
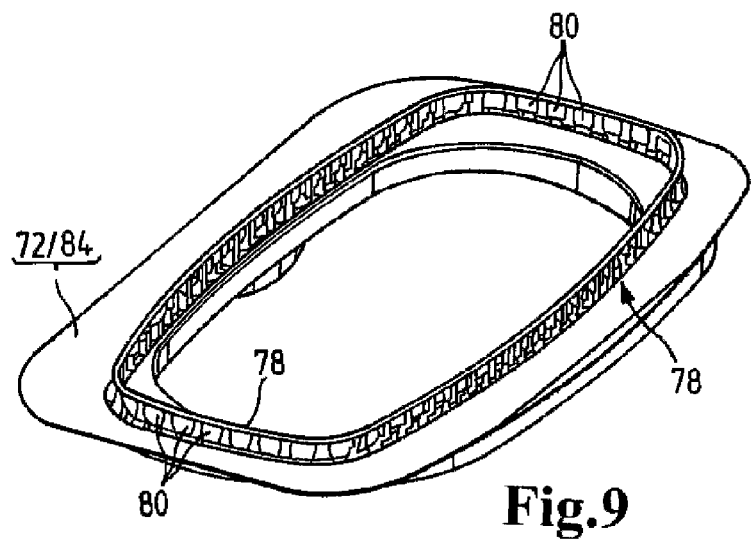

After complete insertion of the main filter element 36 into the housing compartment 68 of the filter housing 12 as illustrated in FIG. 6, the main filter element 36 is pre-positioned in the housing compartment 68. Now the servicing cover 18 that is in the open position is pushed downwardly about its hinges 20 in the closing direction so that a locking action 24 is created between the locking depression 56 of the grip member 22 and its counterpart 58 and the cyclone preseparator 26 of the filter device 10 proposed in accordance with the invention. During closing of the servicing cover 18, i.e., during the one-hand closing movement of the servicing cover 18, shoulders 74 that are integrally injection-molded thereon in the area of the circumferentially extending collar 34 engage the circumferential rim 72 of the main filter element 36. As a result of the ramp-shaped structure of the insertion stays 64 the main filter element 36 upon its insertion into the housing compartment 68 is already positioned very close to the contact surface 66 of the housing compartment 68 of the filter housing 12. When closing the servicing cover 18, contacting of the circumferential rim 72 is realized by means of the shoulders 74 of the servicing cover 18 that engage the circumferential rim so that the seal 76 on the topside of the circumferential rim 72, compare illustration according to FIGS. 7-9, is seal-tightly moved against the matching contact surface 66 of the housing compartment 68 of the filter housing 12. In this way, the sealing force that pushes the seal 76 against the contact surface 66 of the filter housing 12 is generated by the shoulders 74 when closing the servicing cover 18. The sealing action is realized in radial direction wherein for maintaining the sealing position a force is required that acts in the axial direction.

Wrong premounting of the main filter element 36 is prevented, on the one hand, by the configuration of the insertion stays 64 on the lateral surfaces of the housing compartment 68 and, on the other hand, in that the screw guides 86 extend horizontally on the lateral surfaces of the housing compartment 68 below the insertion stays 64. The screw guides 86 serve for receiving screws with which the cyclone preseparator 26, with formation of a seal-tight butt joint 28, is screw-connected to the filter housing 12 of the filter device 10 proposed according to the present invention. By means of the axial pretension generated by the screw connection, the butt joint 28 between the cyclone preseparator 26 and the filter housing 12 is achieved.

FIGS. 7, 8, and 9 show embodiment variants of the circumferential rim of the exchangeably configured main filter element 36.

The illustration according to FIG. 7 shows that the circumferential rim 72 of the main filter element 36 according to the illustrations in FIGS. 5 and 6 is injection-molded from a plastic material 84. When injection molding the circumferential rim 72, the rim is designed such that with the injection process of the circumferential rim 72 of a plastic material 84, to which the grip tab 62 is directly integrally injection-molded, and when manufacturing the circumferential rim 72 at the same time a plastic stabilization blade 78 is integrally injection-molded. The latter may comprise penetrations 80 that are separated from one another by webs. These penetrations 80 have the task, compare also illustration according to FIG. 9, that the seal 76 that is integrally injection-molded of a material, for example, PUR, having elastic properties, may flow into the penetrations 80 of the stabilizing blade 78 of the circumferential rim 72 so that a positive-locking and material-liquid connection of the seal 76 with the stabilizing blade 78 as a result of flowing of the PUR material into the penetrations 80 is achieved. This means that a seal 76 produced in this way can survive a large number of load changes because a mechanically stable connection between the seal 76, upon closing of the servicing cover 18, at the contact surface 66 of the housing compartment 68 and the circumferential rim 72 can be achieved.

In the illustration according to FIG. 8 it is shown that the main filter element 36 has integrally injection-molded thereto, compare FIG. 5, the annular cover 46 in which the two filter bellows 40 and 42, not illustrated in FIG. 8, are foamed in with their axial end faces. The illustration according to FIG. 8 also shows that in the area of the circumferential rim 72 the interior 44 is closed off by the cover disk 48. On the bottom side or topside of the circumferential rim 72, as shown in the perspective illustration according to FIG. 8, the grip tab 62 is integrally injection-molded and enables a one-hand exchange of the main filter element 36, with the servicing cover 18 in the open position, from the housing compartment 68 of the filter housing 12 of the filter device 10 proposed according to the invention.

The illustration according to FIG. 9 is a perspective top view onto a circumferential rim 72. The circumferential rim 72 which is located at the topside of the main filter element 36 is produced from a blade material 84 which is significantly more stable than the material of which the seal 76 is subsequently injection-molded. The material of which the seal 76 is injection-molded is a plastic material which has substantially better elasticity properties and therefore, when producing the seal 76, flows also through the penetrations 80 in the stabilizing blade 78 at the circumferential rim 72 and therefore generates an integrally injection-molded connection between the sealing material 76 and the material of which the stabilizing blade 78 or the circumferential rim 72 is injection-molded.

In the illustration according to FIG. 8 the seal 76 is illustrated that extends about the stabilizing blade 78 and is comprised of material such as PUR material 82, an easily foamable plastic material.

Figure 10:
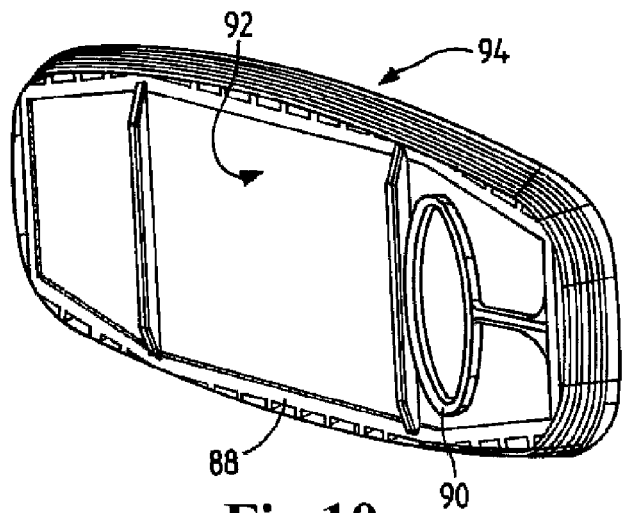
FIG. 10 depicts a tear-off seal provided on a filter element.

FIG. 10 shows a tear-off seal provided on the filter element which in the perspective illustration according to FIG. 10 is located on an inner side 92 of the filter bellows 40 or 42. The tear-off seal 90 is enclosed by a plastic frame 88; an exterior side of the filter bellows 40 or 42 is characterized by reference 94.

Figure 11:
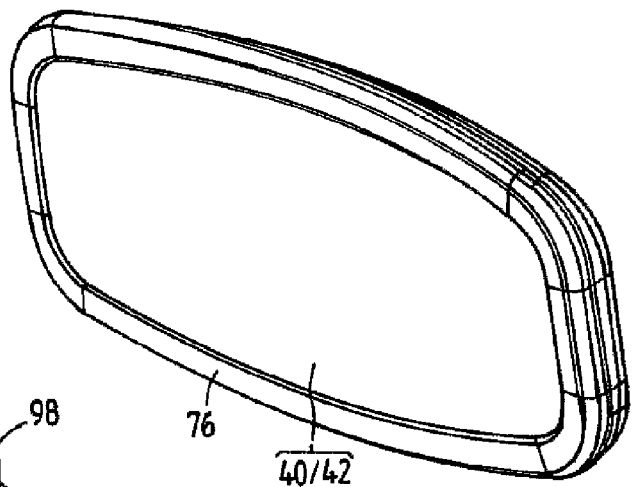
FIG. 11 depicts a PUR seal extending circumferentially on an end face of a filter bellows.

FIG. 11 shows a seal 76 on a filter bellows 40 or 42 which again surrounds a cover. The seal 76 that is preferably embodied as a circumferential seal is foamed of a materials such as PUR.

Figure 12:
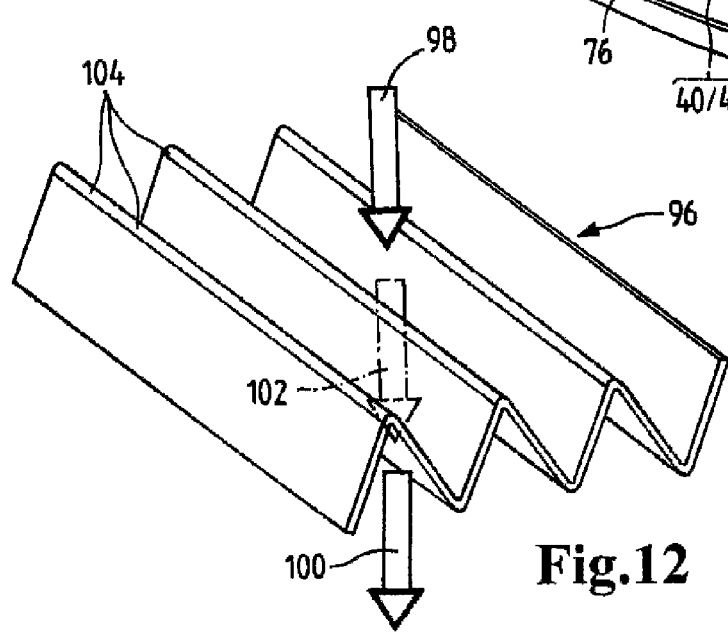
FIG. 12 depicts a simplified illustration of the folding geometry.

The illustration according to FIG. 12 is a simplified representation of the folding geometry of a filter bellows. The folding geometry 96, here embodied as a star-shaped fold arrangement 104, is flowed through in the flow direction 102 by raw air 98 that is unfiltered. The reference numeral 100 indicates the filtered clean air that exits from the filter material in which the separated particles remain. The folding geometry 96 schematically indicated in FIG. 12 that is a star-shaped folding arrangement 104 is characterized by a distinct zigzag contour of peaks and valleys which is embodied oval or circular on a filter bellows 40 or 42.

FIG. 13 shows a filter element that is pressed by means of a leaf spring in the housing axially against a seal seat. In order to facilitate servicing of element, a pressure action can be generated in two stages (I and II). These two stages are realized by "bumps" of different height in the spring. Until the first stage is reached the filter element rests freely in its guide. When the element is pushed across the first stage, the lower part of the seal is pressed onto the seal seat. When the element is pressed farther into the seal seat, by means of a correspondingly shaped ramp on the filter element terminal disk, the second stage is reached and also the upper part of the seal is pressed against the seal seat. The end position is defined by an undercut that is provided on the terminal disk. This undercut secures the element in its end position in the vertical direction and provides a haptic feedback to the person performing servicing of the element.

The invention claimed is:

1. An exchangeable filter element (36) for installation into a housing compartment (68) of a filter housing (12), the filter element (36) comprising:
    an inflow face at an axial end of said filter element (36);
    an outflow face an opposing axial end of said filter element (36),
    a first filter bellows (40) extending between said inflow and outflow faces, said first filter bellows (40) having an interior (44) forming a first flow space open at one of said flow faces and closed off an opposing one of said flow faces;
    a second filter bellows (42) arranged radially outwardly of said first filter bellows (40), said second filter bellows (42) radially enclosing said first filter bellows (40), said second filter bellows extending between said inflow and outflow faces;
    wherein said first filter bellows (40) and said second filter bellows (42) are connected forming a one-piece exchangeable filter element;
    wherein said first (40) and said second filter bellows (42) are substantially flowed through in radial direction within said exchangeable filter element (36);
    wherein a second flow space is arranged between a radially outer side of said first filter bellows (40) and a radially inner side of said second filter bellows (42);
    wherein said second flow space is open at one of said flow faces and closed an opposing one of said flow faces;
    a circumferentially extending rim (72) secured to at least one of said inflow and outflow faces;
    a grip tab (62) secured to said circumferentially extending rim (72).

2. The exchangeable filter element according to claim 1, wherein
    said first filter bellows (40) is substantially conical relative to its outer diameter;
    wherein said second filter bellows is substantially cylindrical relative to its outer diameter;
    wherein said second flow space extends conically in said axial direction.

3. The exchangeable filter element according to claim 1, wherein
    said filter bellows (40,42) have axially opposing front edges, said front edges arranged at respective ones of said inflow face and said outflow face.

4. The exchangeable filter element according to claim 1, wherein
    said first filter bellows (40) and said second filter bellows (42) are adhesively connected at one of said flow faces.

5. The exchangeable filter element according to claim 3, wherein
    said circumferentially extending rim (72) is arranged on said front edge of said first filter bellows (40) and secured to said first filter bellows (40).

6. The exchangeable filter element according to claim 5, wherein
    said circumferentially extending rim (72) is injection-molded of a plastic material;
    wherein said grip tab (62) is directly integrally injection molded onto said circumferentially extending rim (72) forming a one-piece component.

7. The exchangeable filter element according to claim 6, further comprising:
    a plastic stabilization blade (78) integrally injection-molded onto an axially outward facing surface of said circumferentially extending rim (72), said plastic stabilization blade (78) extending axially outwardly from said circumferentially extending rim (72);
    an elastic seal (76) integrally injection molded onto and secured to said plastic stabilization blade (78).

8. The exchangeable filter element according to claim 7, wherein
    said plastic stabilization blade (78) includes penetrations (80);
    wherein said elastic seal (76) has portions flowed into said penetrations, positive-locking said elastic seal (76) to said plastic stabilization blade (78).

9. The exchangeable filter element according to claim 3, wherein at least one of said filter bellows (40, 42) includes filter media folds extending in said axial direction between said inflow and outflow faces.

10. The exchangeable filter element according to claim 1, further comprising
   a support structure (50) arranged between and radially abutting against said radially outer side of said first filter bellows (40) and said radially inner side of said second filter bellows (42), said support structure (50) maintaining conical geometry of said second flow space.

11. The exchangeable filter element according to claim 10, wherein
   said support structure (50) is formed of a plastic construction comprising ribs extending axially and in a circumferential direction.

12. The exchangeable filter element according to claim 1, further comprising
   an annular cover (46) is secured to and covering said front edges of said first filter bellows (40) and said second filter bellows (42);
   wherein said annular cover has a flow opening extending into an interior (44) of said first filter bellows (40).

13. The exchangeable filter element according to claim 12, further comprising
   a cover disk (48) closing off said interior (44) of said first filter bellows (40).

14. The exchangeable filter element according to claim 5, wherein
   said circumferentially extending rim (72) has a leaf spring comprising two locking positions, said leaf spring arranged at a bottom side of said circumferentially extending rim (72).

15. The exchangeable filter element according to claim 1, wherein
   said first filter bellows (40) and said second filter bellows (42) are glued at their front edges.

* * * * *